US012479227B2

(12) United States Patent
Doran

(10) Patent No.: US 12,479,227 B2
(45) Date of Patent: Nov. 25, 2025

(54) METHOD AND DEVICE FOR PRINTING ON A SUBSTRATE BY WAY OF INKJET PRINTING

(71) Applicant: NOTION SYSTEMS GMBH, Schwetzingen (DE)

(72) Inventor: Michael Doran, Dossenheim (DE)

(73) Assignee: NOTION SYSTEMS GMBH, Schwetzingen (DE)

( * ) Notice: Subject to any disclaimer, the term of this patent is extended or adjusted under 35 U.S.C. 154(b) by 130 days.

(21) Appl. No.: 18/551,289

(22) PCT Filed: Mar. 23, 2022

(86) PCT No.: PCT/EP2022/057667

§ 371 (c)(1),
(2) Date: Sep. 19, 2023

(87) PCT Pub. No.: WO2022/200452

PCT Pub. Date: Sep. 29, 2022

(65) Prior Publication Data

US 2024/0165980 A1 May 23, 2024

(30) Foreign Application Priority Data

Mar. 24, 2021 (DE) ..................... 10 2021 107 415.0

(51) Int. Cl.
*B41M 5/00* (2006.01)
*B41J 2/21* (2006.01)
*B41M 3/00* (2006.01)

(52) U.S. Cl.
CPC .......... *B41M 5/0047* (2013.01); *B41J 2/2132* (2013.01); *B41M 3/008* (2013.01)

(58) Field of Classification Search
CPC ...... B41J 2/2132; B41J 2/2135; B41J 29/393; B41M 5/0047; H10K 71/135; G02F 1/133516
See application file for complete search history.

(56) References Cited

U.S. PATENT DOCUMENTS

| | | | | |
|---|---|---|---|---|
| 6,565,206 | B2 | 5/2003 | Okabe et al. | |
| 2017/0157949 | A1* | 6/2017 | Madigan ................ | B41J 2/2135 |
| 2019/0337302 | A1* | 11/2019 | Döbelt .................. | B41J 2/2132 |

FOREIGN PATENT DOCUMENTS

| | | | |
|---|---|---|---|
| CN | 106960921 | A | 7/2017 |
| CN | 108389979 | A | 8/2018 |
| CN | 108602346 | | 9/2018 |
| CN | 111564573 | A | 8/2020 |
| DE | 697 28 835 | T2 | 4/2005 |
| DE | 102010060950 | A1 | 6/2012 |
| EP | 0984303 | A1 | 3/2000 |
| JP | 2015-180959 | A | 10/2015 |
| WO | 2013145801 | A1 | 10/2013 |
| WO | 2017100098 | A1 | 6/2017 |
| WO | 2018099583 | A1 | 6/2018 |

OTHER PUBLICATIONS

Search Report from corresponding CN 202280021383.3 mailed Jun. 6, 2025.
English abstract for CN 106960921 A (2017).
English abstract for CN 108389979 A (2018).
English abstract for CN 111564573 A (2020).
English abstract for DE 102010060950 A1 (2012).

* cited by examiner

*Primary Examiner* — Jannelle M Lebron
(74) *Attorney, Agent, or Firm* — Caesar Rivise, PC

(57) ABSTRACT

The invention relates to a method for printing on a substrate by inkjet printing. The aim of the invention is to devise a method for printing on a substrate by way of inkjet printing, which method allows a substrate to be printed on efficiently and simply, with the printing result being particularly uniform and without unwanted artefacts and in particular the printed surface being free from visually noticeable different zones. According to this method, landing zones are provided on the substrate in a landing zone pattern consisting of landing zone columns and landing zone rows, and the landing zones are each printed on, using an individual pattern consisting of at least two droplets, by means of print head nozzles of at least one print head, and the print head nozzles and the surface of the substrate are moved relative to one another, in particular along an imaginary nozzle path, during printing. The droplets are printed within at least a part of the individual patterns, preferably within each of the individual patterns, such that any mutual influence of the droplets within an individual pattern on the substrate is counteracted.

10 Claims, No Drawings

METHOD AND DEVICE FOR PRINTING ON A SUBSTRATE BY WAY OF INKJET PRINTING

CROSS-REFERENCE TO RELATED APPLICATIONS

This application is a Section 371 of International Application No. PCT/EP2022/057667 filed Mar. 23, 2022, which was published under International Publication No. WO 2022/200452 A1, which claims priority to Germany patent application 10 2021 107 415.0, filed Mar. 24, 2021, the disclosures of which are incorporated herein by reference in their entireties.

The invention relates to a method for printing on a substrate by inkjet printing.

Methods for printing on a substrate by way of inkjet printing are known from the prior art in a variety of embodiments and are used for numerous applications, for example for printing on both rigid and flexible substrates. The method of inkjet printing is particularly suitable for specific applications that require a precise amount of a functional liquid to be placed in multiple, precisely defined surface areas of the substrate, the respective landing zones. Such applications relate, for example, to technical or medical sensor surfaces, reaction surfaces for medical applications or else pixel areas of displays, such as LCDs, TFTs, OLED displays, or e-paper.

In particular, when printing RGB patterns as color filters on e-paper displays, numerous landing zones are typically printed, wherein the size of each individual pattern to be printed can be very different and in this case both very small, for example 40×40 μm, but also large, such as 200×1000 μm. However, a typical size of the individual patterns is about 60×200 μm. In order to enable a colored representation by means of e-paper, a printed color layer, in particular individual red (R), green (G) and blue (B) pixel areas as filters, is visible in the regions in which the underlying e-paper is driven white. By contrast, the e-paper pixels which are driven black absorb the light so that the printed RGB color filter is visible only very faintly and thus the e-paper pixels appear almost without any color impression. Usually, in the case of colored e-paper, three colored subpixels (RGB) and optionally additionally a white subpixel form a pixel of a high-resolution pixel array. Each (colored) subpixel represents a landing zone and each color represents its own landing zone type for printing.

In order to achieve a high quality of the printing result, in particular the surface of an e-paper, it is necessary for the individual subpixels to be formed uniformly over the entire surface of the substrate. Both the positioning and size of the pixels, as well as the amount of color filter emitted into each subpixel as the landing zone of the print within narrow limits, are of great importance.

In order to be able to obtain a reproducible and free of unwanted artefacts printing result, it is common practice in prior art inkjet printing applications for metering that the exact same amount of ink or the exact same number of inkjet droplets are placed in each landing zone of a landing zone type, i.e. in all landing zones of the same function, color, shape and/or size.

The eye of an observer is very sensitive in detecting intensity differences in the printed substrate, in particular in the case of color filters of e-paper, in particular if several printed individual patterns next to and/or underneath each other have similar faulty properties that are at the same time slightly different from the other individual patterns of a neighboring region.

In practice, such slight differences often result from inherent print head nozzle variations, whereby the visual impression of a subpixel differs significantly from other subpixels if the printed areas are of different sizes, although the exact same amount of ink was printed. Conversely, the impression with the same area, but slightly different amounts of ink is likewise markedly different. Thus, position fluctuations of the print head nozzles, which lead to fluctuations in area, and/or real volume fluctuations of the ink quantity, can lead to such undesired effects.

If the droplets of an individual pattern impinge on the substrate at different times, this can also lead to a different visual impression of several individual patterns, since the printing medium on the substrate is possibly not immediately absorbed and surface tension effects of the droplet just printed can lead to a systematic flow of the printing medium towards already previously printed droplets.

The invention is therefore based on the object of providing a method for printing on a substrate by way of inkjet printing, which makes it possible to print on a substrate efficiently and in a simple manner, wherein the printing result is particularly uniform and without unwanted artefacts and wherein, in particular, the occurrence of visually noticeable different zones is avoided.

According to the invention, the object is solved by a method in accordance with claim 1. Advantageous developments of the invention can be found in the dependent claims.

In the method according to the invention for printing on a substrate by way of inkjet printing, landing zones are predetermined on the substrate, in particular in a landing zone pattern consisting of landing zone columns and landing zone rows, wherein the landing zones are each printed on, using an individual pattern consisting of at least two droplets, by means of print head nozzles of at least one print head, and the print head nozzles and the surface of the substrate are moved relative to one another, in particular along an imaginary nozzle path, during printing. The droplets are printed within at least a part of the individual patterns, preferably within each of the individual patterns, such that any mutual influence of the droplets within an individual pattern on the substrate is counteracted.

The method according to the invention makes it possible in an advantageous way to achieve a printing result being particularly uniform and without unwanted artefacts, since influences of the individual droplet of an individual pattern among each other are kept as low as possible and accordingly each droplet contributes individually and equally to the overall visual result. This is particularly relevant for the printing of individual patterns consisting of significantly more than one droplet on the surface of the substrate, since the adjacent arrangement of always at least two identical droplets can easily lead to strong and frequent artefacts of the printed image.

Printing is understood in principle to mean a method in which a liquid or flowable printing medium is applied to a surface, this being performed in a targeted manner according to a template, according to a predetermined pattern and/or at a predetermined position. According to the invention, the printing method is an inkjet printing, i.e., a matrix printing, in which the printing medium to be applied is applied in droplets or as a jet to the medium to be printed. Accordingly, the printing preferably takes place without contact, i.e., without direct contact between the device for printing and the substrate.

Printing is performed by means of one or more print heads, wherein the print head can be moved relative to the substrate to be printed during printing, such that different positions of the substrate can be printed. The print head can be stationary and the substrate can be moved, or the substrate can be stationary and the print head can be moved. In principle, the print head has at least one print head nozzle for dispensing droplets or a jet of the printing medium, wherein preferably numerous print head nozzles are arranged on the print head in a row and particularly preferably equidistantly relative to one another. In addition, the print head nozzles can also be arranged on the print head in multiple rows, in particular one behind the other and/or laterally offset from one another in a printing direction. Very particularly preferably, the individual print head nozzle rows are offset laterally with respect to one another in such a way that all nozzle paths of the print head have the same distance from one another, whereby a uniform lateral resolution is achieved.

The substrate surface lying under the region of the print head nozzles during printing and preferably during an individual pass of the print head relative to the substrate surface is referred to as a print head path, while the perpendicular projection of each individual print head nozzle towards the surface of the substrate of a trajectory to be traveled over during the printing process is referred to as a nozzle path. Accordingly, the nozzle path is not necessarily physically mapped on the substrate, but is initially an imaginary trajectory. However, if a print nozzle were to dispense a printing medium continuously over the maximum printing region or along a landing zone column during a linear movement, the nozzle path would be reproduced on the surface of the substrate by means of the printing medium. In principle, the nozzle path can be linear, or it can have any other non-linear course, and/or it can have any angle to the landing zone columns or the landing zone rows. Particularly preferred is an embodiment of the method that is alignment-free, i.e., without an alignment of the substrate relative to the print nozzle path preceding the printing, in particular on the basis of alignment features. A print head with multiple print head nozzles arranged in a row generates multiple imaginary nozzle paths over the substrate surface during an individual pass of the substrate, with the distance between the nozzle paths corresponding to the native lateral resolution of the print head.

The printing medium, which is applied to the substrate as droplets during printing, can basically be any liquid and serve any purpose. The printing medium can be based, for example, on an aqueous or non-aqueous solvent and can also have any further functional components, for example dyes and pigments, but also chemically and/or biochemically active substances. Particularly preferably, the printing medium is an ink or a filter dye solution to print a subpixel of a display.

The substrate can in principle be formed from any material and can have any shape, the substrate preferably having a planar, printable surface and particularly preferably being formed generally flat, in particular as a plate or film. The substrate can be both rigid and flexible. An example of a flexible substrate is a flexible EPD (electronic paper display) which, as an unprinted substrate, has an original black/white resolution of 150 ppi with, in each case, a TFT pixel size of 170 μm. In order to generate a color display based on such an EPD, an RGB filter is printed on top of each black/white TFT pixel, with each color pixel usually being somewhat smaller than the TFT pixel size, e.g., only 150 μm. The resulting color display resolution is then for example 75 ppi. In this case, several, for example four, landing zone grids are preferably arranged on the surface of the substrate, shifted relative to one another, wherein a grid with a red color filter, a grid with a green color filter, and a grid with blue color filter are printed and the fourth grid remains unprinted. Further preferably, at least one landing zone of a landing zone type, for example of a color, is arranged in each TFT pixel.

An important criterion for high quality is the precise placement of color pixels in the intended positions of each TFT pixel, wherein these target positions are typically specified by the substrate, for example in the form of recesses in the substrate or as a TFT pattern, as landing zones. While other criteria could apply as well, it is mostly an essential condition that the color pixel or a subpixel within the TFT pixel must not spill over into adjacent TFT pixels, but must be within the TFT pixel area for all pixels via an active matrix display.

Accordingly, a landing zone is an underlying structure within the display, for example a TFT driven pixel of a display, wherein the landing zones are preferably provided to be printed with exactly one individual pattern each. In principle, the landing zones can be physically predefined on the substrate or they can only represent positions that are specific over the entire surface but are not directly visible on the substrate itself. In this case, a substrate can have one or more different types of landing zones. Different types of landing zones can, for example, be printed with different printing media and can receive different quantities of the printing medium or can have different geometries. Preferably, the landing zone types are arranged on the substrate in a systematic or periodically repeating manner in at least one, preferably two, spatial directions, or form repeating, superordinate patterns. Particularly preferably, an e-paper or an EPD has at least three types of landing zone in the colors red, green and blue. In addition, it is conceivable for landing zone types of different shape and/or size to be provided for one or more of these colors, so that the total number of the types of landing zone to be printed on the substrate is increased accordingly. Thus, multiple landing zone patterns can be arranged offset from one another on a substrate surface, wherein multiple landing zone patterns are preferably arranged in each case in the intermediate space of the other landing zone pattern, in particular such that the individual landing zones of the different landing zone patterns are periodically repeated along the substrate surface. Very particularly preferably, several landing zone patterns are provided with an origin that is slightly offset from one another, the landing zone patterns preferably being formed identically to one another.

The individual landing zones of the substrate are preferably arranged in a landing zone pattern of landing zone columns and landing zone rows, wherein the landing zone columns and the landing zone rows are particularly preferably positioned at a fixed angle and/or in a constant arrangement relative to one another over the entire substrate surface. Very particularly preferably, the landing zone columns and the landing zone rows are aligned perpendicular to one another and/or in a rectangular matrix. Although it is preferred that the individual landing zone columns and landing zone rows are formed identically to one another, they can also differ from one another in their size and/or arrangement, up to a random placement of the individual landing zones in the landing zone pattern, which then is a pseudo-random pattern. In order to align the substrate relative to the printing device or for nozzle control, the substrate can also have alignment features which can preferably be detected visually or otherwise by sensors.

An individual pattern is a single printed area, wherein each individual pattern is formed from at least two printing medium droplets or ink droplets printed by means of one or more print head nozzles. Preferably, each individual pattern is printed in exactly one landing zone or each landing zone contains exactly one individual pattern. All individual patterns for a landing zone type are particularly preferably identical to one another and, in this case, very particularly preferably are printed from an identical arrangement and/or number of droplets of the printing medium.

In order to avoid visual artefacts and noticeable problems in the printed result, the method according to the invention provides that the printing of the droplets within at least a part of the individual patterns, preferably within each of the individual patterns, is performed in such a way that any mutual influence of the droplets within an individual pattern on the substrate is counteracted. Mutual influence of the droplets is generally understood to mean that the behavior of a droplet impinging on the substrate is changed by a previously placed and/or simultaneously impinging droplet compared to the behavior of an isolated impinging droplet at least in such a way that the visual impression of the printed result is changed.

An example of such an influence is the convergence of two droplets on the substrate, typically reducing the size of the covered area and increasing its intensity at the same time. Also, an influence may result from the fact that an area of the substrate to be printed is already wetted, by a droplet which previously impinged in an adjacent area, with a part of the impinged droplet or a component of the impinged drop, such as its solvent. However, avoiding mutual influence does not fundamentally preclude allowing the droplets to touch one another on the substrate; rather, placing the droplets without contact or at a distance from one another is only one possible embodiment. Rather, mutual influence can also be avoided by ensuring that the interaction between the droplets amongst each other is symmetrical, i.e., that all droplets of an individual pattern mutually influence one another to the same extent and that, for example, the droplets are printed at the same distance from one another and/or simultaneously on the substrate.

Mutual influence can be reduced or even prevented in particular by spatial and/or temporal control of at least one print head and in particular of the individual print head nozzles for printing the droplets within at least a part of the individual patterns, preferably within each of the individual patterns, wherein this control is particularly preferably performed in such a way that droplet placement within an individual pattern on the substrate is achieved with as few interactions as possible and, in particular, interaction-free droplet placement. Within the scope of such spatial and/or temporal control, in particular the order, the temporal sequence and/or the spatial position of the droplet placement can be varied or adapted.

In order to achieve both particularly fast printing and particularly precise positioning of the droplets, a preferred embodiment of the method for printing on a substrate according to the invention provides that the printing of all droplets of an individual pattern and/or all droplets of the area below the print head is performed during exactly one relative movement of the print head and the substrate, in particular in exactly one pass.

In an advantageous further development of the method according to the invention for printing on a substrate, the printing of all droplets of an individual pattern is performed within a time interval of less than 100 ms, preferably of less than 50 ms, more preferably of less than 10 ms and most preferably of less than 1 ms, whereby mutual influence due to a droplet running into the area of a subsequently impinging drop on the substrate is prevented in a particularly simple manner. As a result of the fact that all droplets impinge on substrate almost simultaneously, the condition of the substrate is identical for all droplets and, moreover, the interaction of two droplets printed adjacent to one another in an individual pattern, insofar as such an interaction occurs, takes place to the same extent for each of the droplets due to the respective other droplet, such that both droplets ultimately result in an identical visual impression of the printed substrate. Furthermore, it is preferred that printing from all adjacent print head nozzles into a single landing zone takes place simultaneously and/or printing of all droplets of an individual pattern in the direction of movement of the print head relative to the substrate takes place one after the other and/or in this sequence.

A particularly preferred embodiment of the method according to the invention provides that all droplets of an individual pattern are placed on the substrate in such a way that the ink of the individual droplets does not come into contact with the ink of all other droplets, in particular of the respective individual pattern, on the substrate, in order to prevent multiple droplets from coalescing. The volume of a droplet and/or the distance between adjacent printed droplets is preferably selected such that the distance between the droplets on the substrate is as small as possible so that good ink coverage is achieved. With such non-contact placement, droplet application can then occur in any order and/or temporal sequence.

In order to counteract mutual influence of the droplets particularly effectively, a preferred embodiment of the method according to the invention provides that all droplets of all individual patterns of a single landing zone type are printed below the print head in a single pass and/or that during exactly one relative movement of the print head and the substrate, in particular in exactly one pass, exclusively individual patterns of a single landing zone type are printed using the one print head or using a single one of a plurality of print heads, wherein preferably at the same time each of the individual patterns is printed completely or all droplets of the respective individual pattern are printed. It is particularly preferred that only one pass is made per landing zone type or that exclusively all individual patterns of a specific landing zone type are printed during exactly one pass. Furthermore, it is preferred that no droplets are printed in individual patterns of a different landing zone type below the print head during a specific pass.

In order to increase the positional resolution beyond the native positional resolution of the print head, the printing of each individual pattern and/or trajectory of the print head relative to the substrate is preferably performed in k interlacing passes, wherein in each case the print head and the surface of the substrate are offset relative to each other by a lateral interlacing distance $x=j\times a/k$, wherein a is the smallest distance between two nozzle paths, in particular the native print resolution, or the distance a between two adjacent print head nozzles of the print head. In addition, $j<k$ is particularly preferably selected. Here, jis preferably selected from the set of all natural numbers including zero. The integer j can vary from pass to pass or it may be the same for multiple passes or the entire printing process. Thus, the number of interlaces k is used to increase the print resolution such that with a native print resolution of 600 ppi plus a k=4, an effective print resolution of 2400 ppi can be achieved on the substrate.

In addition, in order to minimize or even completely eliminate an undesirable or asymmetrical interaction of the droplets of an individual pattern, in an advantageous further development of the method according to the invention, the printing of all droplets into each individual pattern during an interlacing pass is performed in less than 100 ms, preferably in less than 50 ms, particularly preferably in less than 10 ms and most preferably in less than 1 ms.

Although the substrate can in principle be any surface, the substrate is preferably a display surface and particularly preferably the surface of an e-paper, such that a corresponding further development of the method according to the invention is provided for the production of colored e-paper. The particular challenge here compared to conventional inkjet printing, for example the printing of a graphic on a paper, is that a periodic pattern of repeating color pixels is to be printed, on which local visual faults and irregularities are particularly easy to notice, such that a particularly precise and free of unwanted artefacts printing result is required over the entire printed surface. Accordingly, it is also particularly preferred that the individual patterns and/or the individual pattern types are filter surfaces of a display, in particular an e-paper.

Several exemplary embodiments of the method according to the invention are described in more detail below:

A flexible e-paper display as an example of a flexible substrate with a black/white resolution of 150 ppi with 170 μm TFT pixel size each is to be printed with a single filter color as an example. Each color pixel should be somewhat smaller than the TFT pixel size, i.e., approximately 150 μm. Accordingly, landing zones are provided on the substrate for receiving the filter color in a rectangular grid of landing zone columns and landing zone rows. The landing zone columns extend approximately in a printing direction in which the substrate can be moved underneath a print head with sixteen print head nozzles arranged in a row in order to be able to print on the substrate. However, it is not necessary for the landing zone columns to be precisely parallel to the printing direction.

In practice, and in contrast to this highly simplified example, not a single landing zone pattern but several landing zone patterns shifted relative to one another are typically printed, wherein the individual landing zones of a landing zone type are arranged in a repeating manner on the substrate. Typically, at least one landing zone of a landing zone type, for example a color filter area, is printed in a color pixel.

For technical reasons, however, it is not always possible to produce the substrate surface to be printed in such a way that droplets impinging on the substrate surface are immediately completely absorbed by the substrate at the location of impact. In particular, droplets may be arranged within an individual pattern such that the printed droplets are in contact with one another on the substrate. In this case, surface tension effects of the still "wet" ink and substrate could cause multiple droplets of an individual pattern to coalesce. However, the exact resulting geometry of the coalesced droplets is significantly influenced by the spatial and temporal sequence of the applied droplets.

This results in various possibilities for printing on a substrate for an e-paper by way of inkjet printing in accordance with one embodiment of the method according to the invention, wherein the landing zones on the flexible substrate of the e-paper are each printed with an individual pattern consisting of at least two droplets by means of the print head nozzles of at least one print head. In principle, the method is operated and, in particular for this purpose, the at least one print head is controlled in such a way that the printing of the droplets within each individual pattern is performed with the smallest possible mutual influence of the droplets within each individual pattern on the substrate.

A preferred embodiment of the method with the smallest possible mutual influence of the droplets initially provides for a selection of a number of individual patterns which are then printed completely in a single pass of the print head or during a single relative movement of the print head relative to the substrate. In this case, the printing of all droplets of an individual pattern takes place within a maximum of 2 ms.

In a special embodiment of the method with the smallest possible mutual influence of the droplets, the printing of all droplets of each individual pattern or each individual pattern of a specific individual pattern type, for example the red pixels, is performed during exactly one relative movement of the print head relative to the substrate, as a result of which, on the one hand, all droplets of an individual pattern are performed in a very rapid temporal sequence and, on the other hand, are performed in a fixed sequence which repeats itself for all individual patterns.

Furthermore, the droplets of an individual pattern are preferably placed in such a way that they do not come into direct contact with another droplet at least at the moment of impact on a surface of the substrate. In particular, it is preferred to place the droplets in such a way that they do not come into contact with each other at all or only very late, shortly before complete drying, on the substrate.

Largely uniform printed individual patterns, in particular of the same landing zone type, for example of a respective filter area of a color, will be achieved in a possible embodiment of the method for printing with the smallest possible mutual influence of the droplets everywhere on the substrate if all droplets of all printed individual patterns are completely printed during the same pass or relative movement. For this purpose, it is advantageous that the distance between the print head nozzles corresponds to the desired distance between the droplets on the substrate surface, i.e., the desired print resolution in the lateral direction. Alternatively, it is also conceivable that a print head with several print head nozzle rows arranged one behind the other and laterally displaced relative to one another is used to achieve a higher print resolution than the native resolution of a single print head nozzle row.

Alternatively or additionally, the lateral resolution of the print head can be increased by moving the print head in the lateral direction after a first relative movement over a landing zone and, as part of a further relative movement, further printing of droplets into the intermediate spaces between droplets that have already been printed. However, in order to prevent unwanted interaction between the droplets in this process as well, all droplets deposited during the first relative movement of the print head relative to the substrate are deposited in the individual pattern almost simultaneously (typically <1-2 ms), while the next relative movement and correspondingly the next droplet application into this individual pattern is typically performed after approximately 0.5 s to 2 s.

For example, an e-paper display might consist of 84.5 micron square black/white pixels and it might be desired to print with red, green and blue color filter inks. In the simplest case, therefore, three landing zone types are required, namely one for red pixels, one for blue pixels, and one for green pixels. In order to increase placement accuracy, it may be desired to sweep the substrate area with n=3 passes, i.e., relative movements, so that the native resolution of the print head is increased from, for example, 1200 dpi to 3×1200=3600 dpi.

The invention claimed is:

1. A method for printing on a substrate by means of inkjet printing, in which method landing zones are specified on the substrate and the landing zones are each printed with an individual pattern consisting of at least two droplets by means of print head nozzles of at least one print head, wherein the print head nozzles and the surface of the substrate are moved relative to one another during printing, wherein the printing of the droplets within at least a part of the individual patterns, or within each of the individual patterns, is performed such that mutual influence of the droplets within an individual pattern on the substrate is counteracted.

2. The method for printing on a substrate according to claim 1, wherein the spatial and/or the temporal control of the at least one print head for printing the droplets within at least a part of the individual pattern, or within each of the individual patterns, is performed such that an interaction-free drop placement within an individual pattern on the substrate is achieved.

3. The method for printing on a substrate according to claim 1, wherein the printing of all droplets of an individual pattern and/or of all droplets of the area below the print head is performed during exactly one relative movement of the print head and the substrate, or in exactly one pass.

4. The method for printing on a substrate according to claim 1, wherein the printing of all droplets of an individual pattern is performed within a time interval of less than 100 ms, or of less than 50 ms, or of less than 10 ms, or of less than 1 ms.

5. The method for printing on a substrate according to claim 1, wherein all droplets of an individual pattern are placed on the substrate in such a way that the ink of the individual droplets does not come into contact with the ink of all other droplets, or of the respective individual pattern, on the substrate, in order to prevent the multiple droplets from coalescing.

6. The method for printing on a substrate according to claim 1, wherein all droplets of all individual patterns of a single landing zone type are printed below the print head in a single pass and/or during exactly one relative movement of the print head and the substrate, or in exactly one pass, exclusively individual patterns of a single landing zone type are printed using the one print head or using a single one of a plurality of print heads, wherein each of the individual patterns is printed completely or all droplets of the respective individual pattern are printed at the same time.

7. The method for printing on a substrate according to claim 1, wherein, in order to increase the positional resolution beyond the native positional resolution of the print head, the printing of each individual pattern and/or each trajectory of the print head relative to the substrate is performed in k interlacing passes, wherein the print head and the surface of the substrate are offset relative to one another by a lateral interlacing distance x=J×a/k during each of the passes, wherein a is the smallest distance between two nozzle paths and is preferably J>k.

8. The method for printing on a substrate according to claim 1, wherein the printing of all droplets in each individual pattern during an interlacing pass is performed in less than 100 ms, or in less than 50 ms, or in less than 10 ms, or in less than 1 ms.

9. The method for printing on a substrate according to claim 1, wherein the substrate is a display surface and in particular the surface of an e-paper.

10. The method for printing on a substrate according to claim 1, wherein the individual patterns and/or the individual pattern types are filter surfaces of a display or of an e-paper.

* * * * *